US 11,936,010 B2

(12) United States Patent
Guillet

(10) Patent No.: US 11,936,010 B2
(45) Date of Patent: Mar. 19, 2024

(54) METHOD FOR DETECTING AN OPERATING ANOMALY OF A BATTERY AND SYSTEM IMPLEMENTING SAID METHOD

(71) Applicant: Commissariat à l'énergie atomique et aux énergies alternatives, Paris (FR)

(72) Inventor: Nicolas Guillet, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 743 days.

(21) Appl. No.: 17/050,247

(22) PCT Filed: Apr. 23, 2019

(86) PCT No.: PCT/EP2019/060301
§ 371 (c)(1),
(2) Date: Oct. 23, 2020

(87) PCT Pub. No.: WO2019/206867
PCT Pub. Date: Oct. 31, 2019

(65) Prior Publication Data
US 2021/0057783 A1    Feb. 25, 2021

(30) Foreign Application Priority Data

Apr. 24, 2018  (FR) ........................ 1853570

(51) Int. Cl.
| | | |
|---|---|---|
| H01M 10/42 | (2006.01) | |
| G01N 29/07 | (2006.01) | |
| H01M 10/48 | (2006.01) | |

(52) U.S. Cl.
CPC ........ *H01M 10/4257* (2013.01); *G01N 29/07* (2013.01); *H01M 10/48* (2013.01);
(Continued)

(58) Field of Classification Search
CPC ............. H01M 10/4257; H01M 10/48; H01M 2010/4271; G01N 29/07; G01N 2291/011
(Continued)

(56) References Cited

U.S. PATENT DOCUMENTS

| | | | |
|---|---|---|---|
| 2013/0335094 A1* | 12/2013 | Adams | ................ G01R 31/387 324/426 |
| 2016/0197382 A1 | 7/2016 | Sood et al. | |

(Continued)

FOREIGN PATENT DOCUMENTS

| | | |
|---|---|---|
| DE | 10 2015 210 266 A1 | 12/2016 |
| JP | 2005-291832 A | 10/2005 |

(Continued)

OTHER PUBLICATIONS

International Search Report as issued in International Patent Application No. PCT/EP2019/060301, dated Jul. 12, 2019.

(Continued)

*Primary Examiner* — Nathaniel R Pelton
(74) *Attorney, Agent, or Firm* — Pillsbury Winthrop Shaw Pittman LLP

(57) ABSTRACT

A method for detecting an anomaly in operating a battery using a battery management system, including an acoustic receiver attached to a battery wall, and a calculating system connected to the acoustic emitter and the acoustic receiver, a mapping defining a first operating region termed the normal operating region, a second operating region termed the at-risk operating region and a third operating region termed the dangerous operating region, the method including at least one first measurement cycle, each being separated from the preceding measurement cycle by a measurement period, each measurement cycle including receiving an acoustic signal by the acoustic receiver, the received signal being transmitted to the calculating system to obtain a (Continued)

measurement point in the mapping; determining the operating region in which the measurement point is located; and when the measurement point is located in the at-risk operating region or in the dangerous operating region, detecting an anomaly.

9 Claims, 10 Drawing Sheets

(52) U.S. Cl.
 CPC ............... *G01N 2291/011* (2013.01); *H01M 2010/4271* (2013.01)

(58) Field of Classification Search
 USPC ........................................................ 320/136
 See application file for complete search history.

(56) References Cited

U.S. PATENT DOCUMENTS

| | | | |
|---|---|---|---|
| 2016/0223498 A1 | 8/2016 | Steingart et al. | |
| 2017/0144562 A1* | 5/2017 | Thomas | ............ H01M 10/4257 |
| 2017/0331160 A1* | 11/2017 | Mensah-Brown | ... G01R 31/382 |
| 2018/0038906 A1* | 2/2018 | Cher | ................. G01R 31/2837 |

FOREIGN PATENT DOCUMENTS

| | | | |
|---|---|---|---|
| JP | 2014-049401 A | | 3/2014 |
| WO | WO 2017/223219 | * | 12/2017 |
| WO | WO 2017/223219 A1 | | 12/2017 |
| WO | WO 2018/107140 A1 | | 6/2018 |

OTHER PUBLICATIONS

Gold, et al., "Probing lithium-ion batteries' state-of-charge using ultrasonic transmission e Concept and laboratory testing," Journal of Power Sources, vol. 343, (2017), pp. 536-544.

Notice of Reasons for Refusal as issued in Japanese Patent Application No. 2020-559503, dated Feb. 28, 2023.

* cited by examiner

METHOD FOR DETECTING AN OPERATING ANOMALY OF A BATTERY AND SYSTEM IMPLEMENTING SAID METHOD

CROSS-REFERENCE TO RELATED APPLICATIONS

This application is the U.S. National Stage of PCT/EP2019/060301, filed Apr. 23, 2019, which in turn claims priority to French patent application number 1853570 filed Apr. 24, 2018. The content of these applications are incorporated herein by reference in their entireties.

TECHNICAL FIELD OF THE INVENTION

The technical field of the invention is that of the non-intrusive diagnosis and in operation of electrochemical systems for the conversion of energy (batteries, fuel cells). It relates more particularly to a method that uses ultrasound characterisation techniques in order to identify the optimum operating parameters of a battery so as to be able to detect an operating anomaly of the battery thus characterised and, optionally, make the suitable corrections. The invention also relates to a system implementing said method.

TECHNOLOGICAL BACKGROUND OF THE INVENTION

Battery management systems are indispensable in order to satisfy the demands of users the most effectively possible. Generally, the management systems take account of the state of charge of the battery, the state of health of the battery and/or the safety status of the battery. This various information is generally obtained by the measurements of electrical quantities at the terminals of the battery, but also by external data such as that supplied by the thermal analysis techniques (measurement of temperature and/or of heat flow) or non-destructive control (ultrasound characterisation for example). Once these parameters are determined, the management system regulates the operation of the battery so as to optimise the performance thereof.

The analysis techniques by ultrasound acoustic signals recently proposed for the study of batteries in operation (Gold et al., 2017; Sood, Pecht, & Osterman, 2016; Steingart et al., 2016, DE102015210266A1) have however certain disadvantages. First of all, they concern only certain parameters of the battery and do not take into consideration all of the information contained in the acoustic signal measured. In addition, the acoustic signals used generally have the form of pulses of short duration (less than 0.1 ms) that do not allow for the establishing of a stationary state within the battery, thus limiting the mathematical tools that can be used to analyze said signals.

Then, the techniques used do not take account of the particularities of each battery and also do not make it possible to take account of the change in the characteristics of the battery during its life. Indeed, the main characteristics used for the management of the operation of batteries (values of minimum and maximum cell voltage, maximum current, storage and operating temperature range, etc.) are generally provided by the manufacturer. Most of the time, they are present only in the form of general guidelines on the limits concerning certain electrical characteristics, without however taking account of the change in these limits during ageing or according to other operating parameters such as the temperature.

There is therefore a need for a method that makes it possible to determine at any time the optimum parameters for using a battery placed in different operating conditions and to take account of the change of the battery during its life so as to detect any anomaly in the operation of the battery.

SUMMARY OF THE INVENTION

The invention provides a solution to the problems mentioned hereinabove by make it possible to take account of a plurality of parameters contained in the acoustic signals transmitted by the battery under study. Using the analysis of these signals, it is thus possible to determine if the battery is being used in conditions that are optimal for guaranteeing its performance and its durability, or on the contrary, if the conditions of use can be detrimental to the correct operation thereof. It is also possible to determine if the battery risks having risks for the safety of the surrounding property and persons. This allows for a better diagnosis of the battery and therefore to correct the operating parameters more effectively and to keep the battery in the best operating conditions.

An aspect of the invention relates to a method for detecting an anomaly in the operation of a battery using a battery management system, said system comprising an acoustic emitter configured to be attached to a wall of the battery, said acoustic emitter being attached to a wall of the battery during the implementation of the method, an acoustic receiver configured to be attached to a wall of the battery, said acoustic receiver being attached to a wall of the battery during the implementation of the method, and a calculating means connected to the acoustic receiver, a mapping defining a first operating region termed the normal operating region, a second operating region termed the at-risk operating region and a third operating region termed the dangerous operating region. The method according to a first aspect of the invention comprises at least one first measurement cycle, preferably a plurality of measurement cycles, each measurement cycle being separated from the preceding measurement cycle by a period termed the measurement period, each measurement cycle comprising:

- a step of emitting an acoustic signal by the acoustic emitter on instruction from the calculating means;
- a step of receiving an acoustic signal by the acoustic receiver, the received signal being transmitted to the calculating means so as to obtain a measurement point in the mapping;
- a step of determining the operating region in which the measurement point is located;
- when the measurement point is located in the at-risk operating region or in the dangerous operating region, a step of detecting an anomaly.

"Battery" means any electrochemical system for converting and storing electrical energy (rechargeable or not). Thus, it is permitted, using at least one measurement cycle, to identify the operating regime of the battery and any possible anomalies. Furthermore, the step of emitting an acoustic signal makes it possible to generate a response of the battery which is then received during the step of receiving. It is therefore not necessary to constantly acquire the acoustic signal emitted by the battery, as this acquisition is triggered simultaneously an emission and over a duration defined according to the duration of the signal emitted. The problems of noise filtering encountered when the acoustic signal received is simply generated by the operation of the battery itself are prevented. Moreover, the signal emitted during the step of emission has precisely-defined properties (time interval between two emissions, amplitude of the signal, its duration, frequency distribution of the signal), which facilitates the analysis of the signal received and allows for a comparison of the measurements over time. In addition, using operating regions makes it possible to limit the memory required for implementing the method in comparison with the techniques of the prior art. Indeed, in the techniques of the prior art, each measurement is compared with the measurements of a library which requires keeping in memory the large number of measurements that form the library in question. In the method according to a first aspect of the invention, only operating regions are used, which requires much less memory. For example, a reference point can be memorised as well as the distance corresponding to the difference to normality which is admitted and which thus defines the limit between the normal operating region and the at-risk operating region and the limit between the at-risk operating region and the dangerous operating region. In addition, it is faster to locate a measurement point in order to identify where in these three regions said measurement point is located than to carry out a comparison with other points of a library as is done in the prior art. It is important to note that a characteristic such as the state of charge or the state of health alone cannot be used to define a region such as described by the invention. Indeed, the same state of charge can correspond to operation in a "normal" region, a "dangerous" region or an "at-risk region" according to the temperature, the electrical power passing through the battery or the cell voltage for example. Such situations occur in particular during so called "abusive" tests during which a battery is on overload, overheating or in a short circuit.

In addition to the characteristics that have just been mentioned in the preceding paragraph, the method according to a first aspect of the invention can have one or more additional characteristics among the following, considered individually or in all technically possible combinations.

Advantageously, the duration of the pulse is between 0.2 ms and 1 ms. Such a duration of the signal makes it possible to reduce the density of external noises able to be superimposed on the signal and thus mask the signals of short duration. It also makes it possible to establish a stationary state in the battery, which is preferable when the acoustic signals are analysed using mathematical tools such as the Fourier transform. This duration also makes it possible to reduce the amplitude of the signal emitted by the acoustic emitter while still guaranteeing the fact that the energy of the transmitted signal will be sufficiently high for the latter to be detected easily at the acoustic receiver. Finally, this duration makes it possible to reveal the consequences of certain partial transmission phenomena and reflection of waves during the transport of acoustic waves in the material and at the interfaces with the appearance of periodic modulations of the signal due to the superposition of signals with very close frequencies (also called beat frequency).

Advantageously, the mapping comprises a reference point located in the normal operating region, each region is associated with a speed limit, a speed being positive when it is moving away from the reference point and negative when it is approaching the reference point and each measurement cycle comprises:
 a step of calculating the speed of the measurement point in the mapping, this speed being equal to the distance between the measurement point obtained during the preceding measurement cycle and the current measurement point (i.e. obtained in the current cycle) divided by the measurement period;
 a step of comparing the speed of the measurement point with the speed limit associated with the region in which the measurement point is located;
 when the speed of the measurement point is greater than the speed limit associated with the region in which the second measurement point is located, the triggering of the step of detecting an anomaly.

Thus is it possible to anticipate a degradation in the operating conditions of the battery through a change deemed too quick in the speed of the last measurement point. In addition, a corrective action can be set up even before the battery enters into a dangerous or at-risk operating region, which contributes to extending the duration of the life of the battery.

Advantageously, each measurement cycle comprises, when an anomaly is detected, a step of triggering an alert. Thus the user is informed in case of abnormal operation of the battery.

Advantageously, each cycle comprises, when an anomaly is detected or when an alert is triggered, a step of correcting the operating regime of the battery. Thus, in addition to informing the user of a malfunction, the management system implements corrective actions.

Advantageously, when the step of correcting does not make it possible to re-establish a normal operating regime of the battery after a predetermined period of time, a step of switching to degraded mode or a step of stopping the system.

Thus, when the corrective actions implemented are not sufficient, the system ensures that battery damage is limited by putting the latter into degraded mode or stopping it.

Advantageously, a step of reducing the measurement period is triggered by the step of triggering an alert.

Thus, by reducing the measurement period, the method makes it possible to ensure better follow-up of the battery, as the time that separates two consecutive measurement cycles of the operating state of said battery is reduced.

Advantageously, each measurement point obtained during each cycle is stored until a number of measurement points is obtained equal to a threshold value, termed adaptation threshold, the position of the reference point being recalculated then the measurement points erased when said threshold is reached.

Thus, the mapping takes the new measurements into account which allows the system to perform a self-learning using said measurements.

A second aspect of the invention relates to a system for managing a battery comprising means for implementing a method according to a first aspect of the invention.

A third aspect of the invention relates to a computer program comprising instructions that lead the management system according to a second aspect of the invention to execute the steps of the method according to a first aspect of the invention.

A fourth aspect of the invention relates to a support that can be read by a computer, whereon the computer program is recorded according to a third aspect of the invention.

The invention and its various applications shall be better understood when reading the following description and examining the accompanying figures.

BRIEF DESCRIPTION OF THE FIGURES

Figures are shown for the purposes of information and do not limit the invention in any way.

DETAILED DESCRIPTION OF AT LEAST ONE EMBODIMENT OF THE INVENTION

Figure 1:
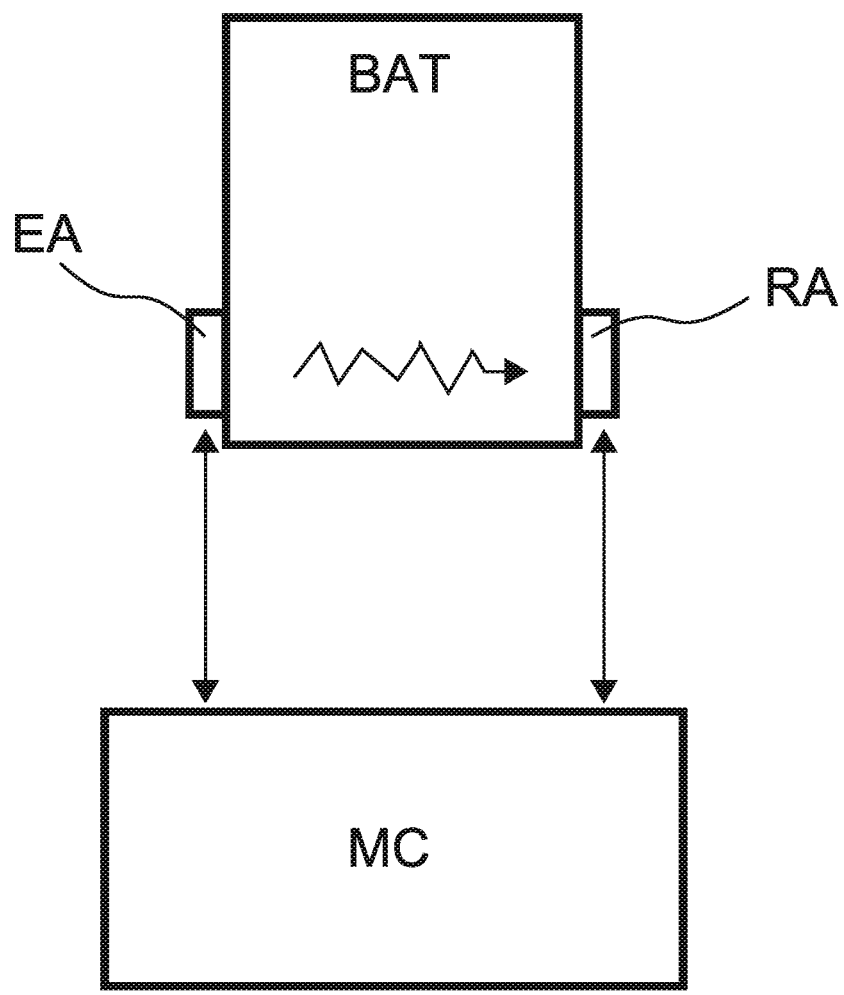
FIG. 1 diagrammatically shows a management system according to a second aspect of the invention.
Figure 2:
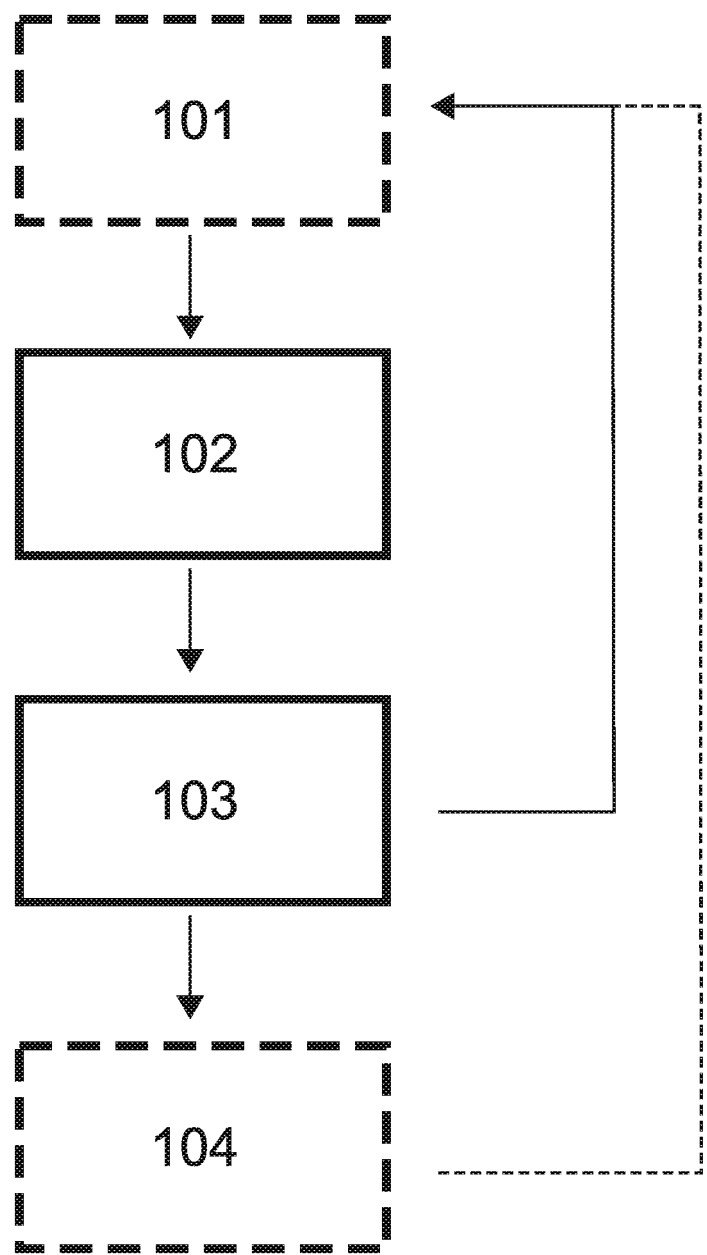
FIG. 2 shows a flowchart of a method according to a first aspect of the invention.

Unless mentioned otherwise, the same element that appears on different figures has a unique reference.

A first embodiment of a first aspect of the invention shown in FIGS. 1 to 4 relates to a method 100 for detecting an anomaly in the operation of a battery BAT using a battery management system BAT. In what follows, "battery" BAT means any electrochemical system for converting and storing electrical energy (rechargeable or non). Preferably, the battery management system BAT comprises means for controlling and measuring the reference physical quantities of the battery BAT such as the current delivered by the battery BAT or the voltage at the terminals of the battery BAT. In addition, the management system comprises an acoustic receiver RA configured to be attached to a wall of the battery BAT (said acoustic receiver being attached to a wall of the battery during the implementation of the method according to a first aspect of the invention), and a calculating means MC connected to the acoustic receiver RA. The acoustic receiver RA is preferably a piezoelectric acoustic receiver RA and the latter is attached to a wall of the battery BAT using a glue or any other means of attaching. For example, the acoustic receiver RA can have a PVDF (PolyVinyliDene Fluoride) base, a device that generally has wide resonance frequency bands comprised between kHz and MHz. Alternatively, the acoustic receiver RA can have a PZT ceramic base (lead zirconate titanate), a device that generally has narrow resonance frequency bands comprised between 10 kHz and a few hundred kHz. The calculating means MC can have the form of a processor associated with a memory, an ASIC board or an FPGA. The connection of the calculating means MC with the acoustic receiver RA can be done by means of a bus, a connection of the Ethernet® type, or by means of a wireless connection, for example Bluetooth®.

The management system also comprises, stored in a memory, a mapping CG defining a first operating region termed the normal operating region ZN, a second operating region termed the at-risk operating region ZR and a third operating region termed the dangerous operating region ZD. More particularly, the normal operating region ZN corresponds to a nominal operation of the battery BAT, the at-risk operating region ZR corresponds to an at-risk operating of the battery BAT, i.e. operating conditions wherein the battery BAT can undergo irreversible degradations in the short term if they are maintained beyond a predetermined duration, and the dangerous operating region ZD corresponds to an operation that results in an immediate irreversible degradation of the battery BAT. This mapping CG can be determined from a library of signals, each signal of the library of signals corresponding to a given operating state of the battery BAT. For example, this library is carried out via learning. For this the battery BAT is placed in different operating conditions corresponding to the authorised operating limits (voltage, current, temperature). Then, the characteristics, more preferably the main characteristics, of the acoustic signals received in the different normal conditions of operation are stored in the library. Advantageously, it is also possible to store the change in the characteristics of the signals according to certain parameters (for example, the change in the signals according to the state of charge at several distinct temperatures: nominal, minimum, maximum operating temperature). The library can for example be supplied by the manufacturer of the batteries BAT. The characteristics of the signals can come from the temporal analysis of the signals (duration, absolute energy, strength of the signal, rising speed of the signal, flight time, duration before maximum amplitude, etc.) and/or from a frequency analysis (maximum frequency, average frequency, frequency centroid, power spectral density, etc.).

In an embodiment, the three operating regions are obtained from a library such as described hereinabove. For this, the barycentre of all of the points of the library is calculated in such a way as to obtain a reference point REF. Then, for each measurement point, the distance separating said point from the reference point REF is calculated in such a way as to obtain the distribution of the distances. It is then possible to identify two distances that define two limits and therefore three regions according to this distribution. For example, in a particularly advantageous embodiment, the library contains only measurements taken in a normal operating state. For each pertinent parameter, a distance corresponding to about 95% of the measurement points ($2\sigma$: 2 times the standard deviation of the deviations measured under normal operating conditions) is determined in such a way as to define the radius of a sphere (the number of dimensions of this sphere is equal to that of the space wherein the mapping CG is carried out) of which the centre is the reference point REF. This sphere then defines the limit between the normal operating region ZN and the at-risk operating region ZR. Then a distance corresponding to 4 times the standard deviation ($4\sigma$) and statistically containing more than 99.99% of the measurement points obtained in normal conditions, is determined in such a way as to define the radius of a second sphere of which the centre is the reference point REF. This second sphere then defines the limit between the at-risk operating region ZR and the dangerous operating region ZD. This embodiment is particularly advantageous in that it makes it possible to determine the three regions while remaining in a normal operating regime. Indeed, in this embodiment, "normal" operating region means a region in which the battery is operating (charge-discharge) or at rest in operating conditions defined as "normal" by the manufacturer. That is to say that it does not leave the nominal ranges of temperature, cell voltage and current (or power), generally detailed in the data sheet provided by the manufacturer. Furthermore, the physical particularities of the acoustic waves received following each emission are included within the limits defined during calibration and operation considered beforehand as "normal" (i.e. within the limit of the 2σ presented hereinabove). Likewise, in this embodiment, "at-risk" operating regions means a region in which the battery is always operating (charge-discharge) or at rest in operating conditions defined as "normal" by the manufacturer. That is to say that it does not leave the nominal ranges of temperature, cell voltage and current (or power), generally detailed in the data sheet provided by the manufacturer. But this time, the physical particularities of the acoustic waves received following each emission leave the limits defined during calibration and operation considered as "normal" (i.e. within the limit of the 4σ presented hereinabove). Furthermore, in this embodiment, "dangerous" operating region means a region in which the battery is always operating (charge-discharge) or at rest in operating conditions defined as "normal" by the manufacturer. That is to say that it does not leave the nominal ranges of temperature, cell voltage and current (or power), generally detailed in the data sheet provided by the manufacturer. But this time, the physical particularities of the acoustic waves received following each emission leave the limits defined during calibration and operation considered beforehand as "at risk" (i.e. beyond the limit of the 4σ presented hereinabove).

Preferably, only the main characteristics of the signals i.e. the most pertinent characteristics to be taken into account are used to generate the mapping CG. However, the characteristics depend strongly on the complete system and the mapping is therefore specific to said system. More particularly, the information required to supply the library depends strongly on the complete system set up and in particular on the following parameters:
- the acoustic emitter EA (positioning in relation to the battery, shape of the frequency range signal, amplitude, etc.);
- particularities of the battery BAT (size, shape, chemistry, packaging);
- particularities of the piezoelectric elements used for recording the signals received (resonance frequency, sensitivity, positioning and quality of the coupling with the battery, etc.).

The method 100 according to a first aspect of the invention comprises at least one first measurement cycle, preferably a plurality of measurement cycles, each measurement cycle being separated from the preceding measurement cycle (or following) by a period termed the measurement period. In other words, monitoring the battery BAT is ensured by the succession over time of measurement cycles. Preferably, this measurement period is constant. However, the latter can change, for example this period can be reduced if the change in the operating regime of the battery BAT gives rise to fears of damaging of the latter, in such a way as to ensure a more frequent monitoring.

For this, each measurement cycle includes a step 102 of receiving an acoustic signal by the acoustic receiver RA, the received signal being transmitted to the calculating means MC so as to obtain a measurement point in the mapping CG. This acoustic signal can be produced by an external source of acoustic signals (noise) able to generate acoustic waves in the desired frequency range. This external source can be for example a processor, a fan or a transistor-based switch-mode power supply. In the case of the use of an external acoustic signal source, it is necessary to have at least one acoustic receiver RA but it is preferable to have at least two acoustic receivers RA. Indeed, with several acoustic receivers RA, the measurements to be considered for the analysis could also include parameters concerning the difference between the signal emitted and the signals received by each one of the receivers RA.

Preferably, the emission of the signal received in controlled. For this, in an embodiment, the management system comprises an acoustic emitter EA configured to be attached to a wall of the battery BAT, said acoustic emitter being attached to a wall of the battery during the implementation of the method according to a first aspect of the invention, the calculating means MC being connected to the acoustic emitter EA. The acoustic emitter EA is preferably a piezoelectric acoustic emitter EA and the latter is attached to a wall of the battery BAT using a glue or any other means of attaching. For example, the acoustic emitter EA can have a PVDF (PolyVinyliDene Fluoride) base, a device that generally has wide resonance frequency bands comprised between kHz and MHz. Alternatively, the acoustic emitter EA can have a PZT ceramic base (lead zirconate titanate), a device that generally has narrow resonance frequency bands comprised between 10 kHz and a few hundred kHz. Preferably, the wall on which the acoustic emitter EA is attached and opposite the wall on which the acoustic receiver RA is attached. In addition, each measurement cycle comprises, before the step 102 of receiving the acoustic signal, a step 101 of emitting an acoustic signal by the acoustic emitter EA on instruction from the calculating means MC. As already mentioned, the emission of a controlled acoustic signal has several advantages. First of all, it is not necessary to constantly acquire the acoustic signal emitted by the battery, as this acquisition is done only when there is an emission. Also the noise filtering problems encountered when the acoustic signal received is simply generated by the operation of the battery itself are avoided. Moreover, the signal emitted during the step of emission has well-known properties, which facilitates the analysis of the signal received and allows for a comparison of the measurements over time.

Figure 3:
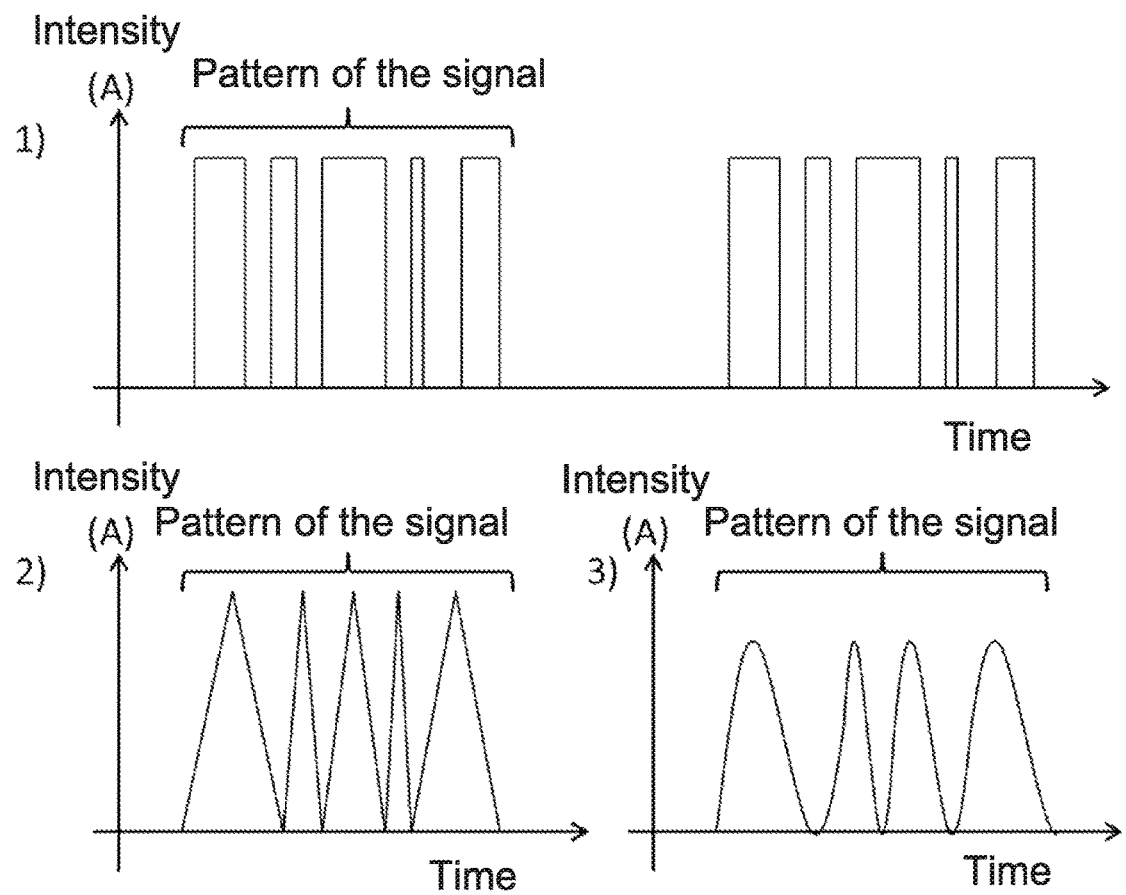
FIG. 3 shows different signal patterns that can be used in a method according to a first aspect of the invention.
Figure 4:
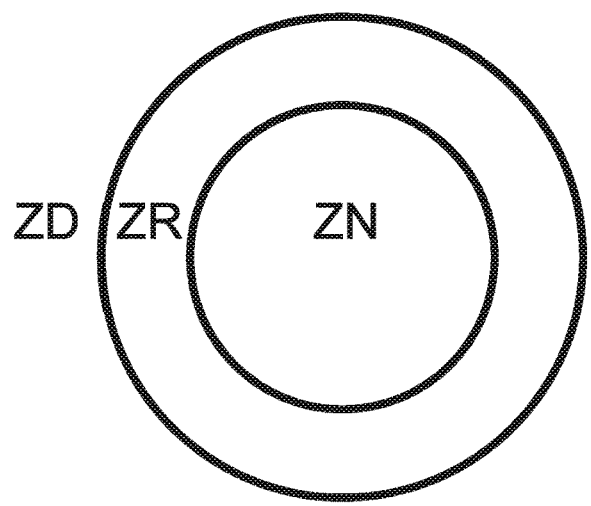
FIG. 4 shows a mapping wherein there are three regions corresponding to three different operating regions of the battery used in a method according to a first aspect of the invention.

Preferably, the signal emitted includes a plurality of frequencies comprised between 1 kHz and 1 MHz, preferably between 100 kHz and 200 kHz. It is thus possible to excite the acoustic emitter EA on a part or all this frequency range. The signal can in particular include several successive frequency components (for example, several sinusoids of increasing or decreasing frequencies successively over time) and/or simultaneous (multi-frequency excitation). As shown in FIG. 3, the pattern of the signal emitted can be a square pattern, a triangle pattern, a sine wave pattern, a combination of a portion at least of these patterns or any shape whatsoever. The shape, frequency and intensity of the signals can be chosen in such a way as to take account of the specificities of each type of battery BAT, the nature of the acoustic emitter EA and/or the nature of the acoustic receiver RA.

Preferably, the duration of the acoustic signal emitted is comprised between 0.2 and 1 ms. This duration makes it possible to reduce the density of external noises able to be superimposed on the signal and thus mask the signals of short duration. It also makes it possible to establish a stationary state in the battery BAT, which is preferable when the acoustic signals are analysed using mathematical tools such as the Fourier transform. It is useful to underline that such a stationary state cannot be obtained with pulses of short duration (typically less than 0.1 ms) such as used in the methods of the prior art. This duration also makes it possible to reduce the amplitude of the signal emitted by the acoustic emitter EA while still guaranteeing that the energy of the signal is sufficiently high so that the latter can easily be detected at the acoustic receiver RA. The reduction in the amplitude (compared to an acoustic signal of short duration) makes it possible to reduce the problems linked to the non-linearities of the response of the battery BAT, of the acoustic emitter EA and/or of the acoustic receiver RA. As such, it is interesting to note that the acoustic signals detected by the acoustic receiver RA are converted into electrical signals so as to be able to be sent and processed by the calculating means MC. This conversion is reliable only if the non-linear phenomena are reduced to a minimum, which is made possible, in the present invention, by the duration of the acoustic signals used. In addition, the signals received by the acoustic receiver RA are obtained from a system in a stationary state, a necessary condition for the use of said signals by frequency data processing techniques such as the Fourier transform, where as the methods of the prior art are confined only to temporal data processing techniques. Finally, this duration makes it possible to reveal the consequences of certain phenomena (partial transmission and reflection of waves during the transport of the acoustic waves in the material and at the interfaces) linked to the transport of the acoustic waves in the matter through the appearance of periodic modulations of the signal due to the superposition of signals with very close frequencies (also called beat frequency). However, this type of signal is very rich in information linked to the transport of acoustic waves through the different materials as well as the interfaces that form the battery BAT.

Each measurement cycle also comprises a step 103 of determining the operating region in which the measurement point is located. As explained hereinabove, the calculating means MC has in memory a mapping CG comprising three regions. Once a measurement point is obtained, it is possible to determine in which of these three regions of this mapping CG it is located. In addition, each measurement cycle comprises, when the measurement point is located in the at-risk operating region ZR or in the dangerous operating region ZD, a step 104 of detecting an anomaly.

To show the influence of the operating conditions of a battery BAT on the signal measured during the implementation of the method 100 according to a first aspect of the invention, different experimental methods were carried out and are presented in FIGS. 5 to 8.

Figure 5A:
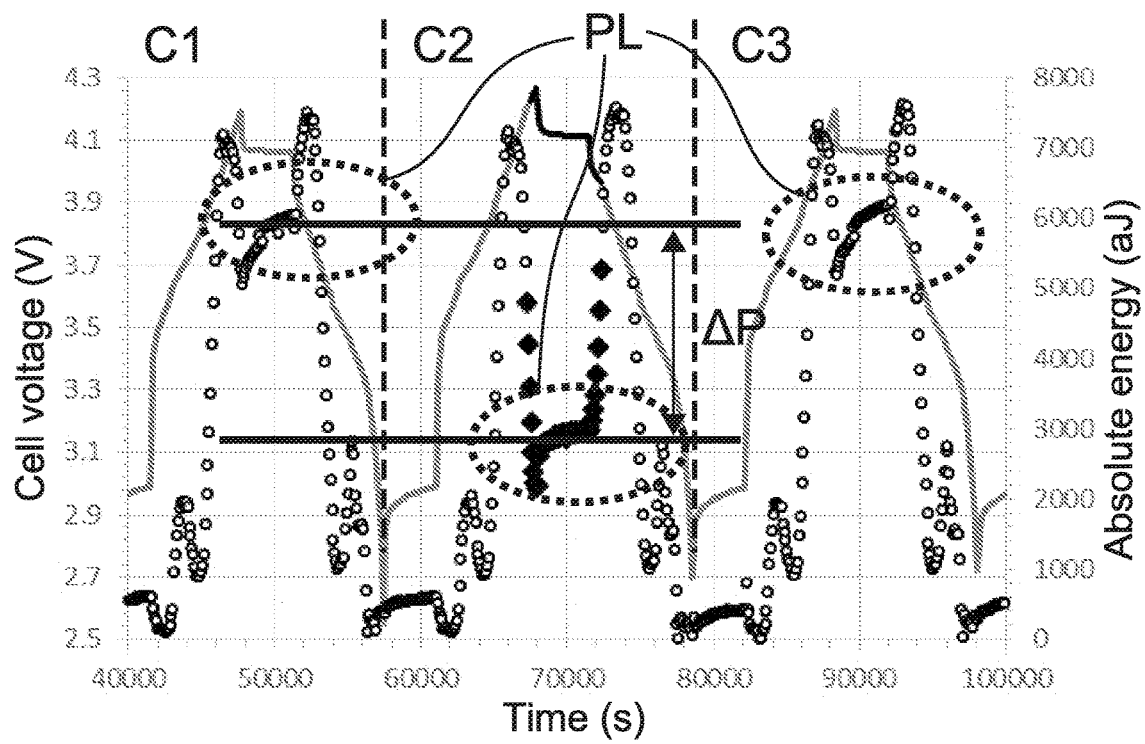
FIGS. 5A and 5C show, for FIG. 5A an example of the change in the absolute energy of the signal emitted in a method according to a first aspect of the invention according to the state of charge, for FIG. 5B an example of the change in the absolute energy of the signal received in a method according to a first aspect of the invention according to the state of charge of the battery, and for FIG. 5C the change in the recommended maximum voltage at the terminals of a Lithium-ion battery of the NMC/G type (positive electrode with a metal oxide base comprised of nickel, manganese and cobalt, negative electrode with a graphite base) according to the temperature.
Figure 5B:
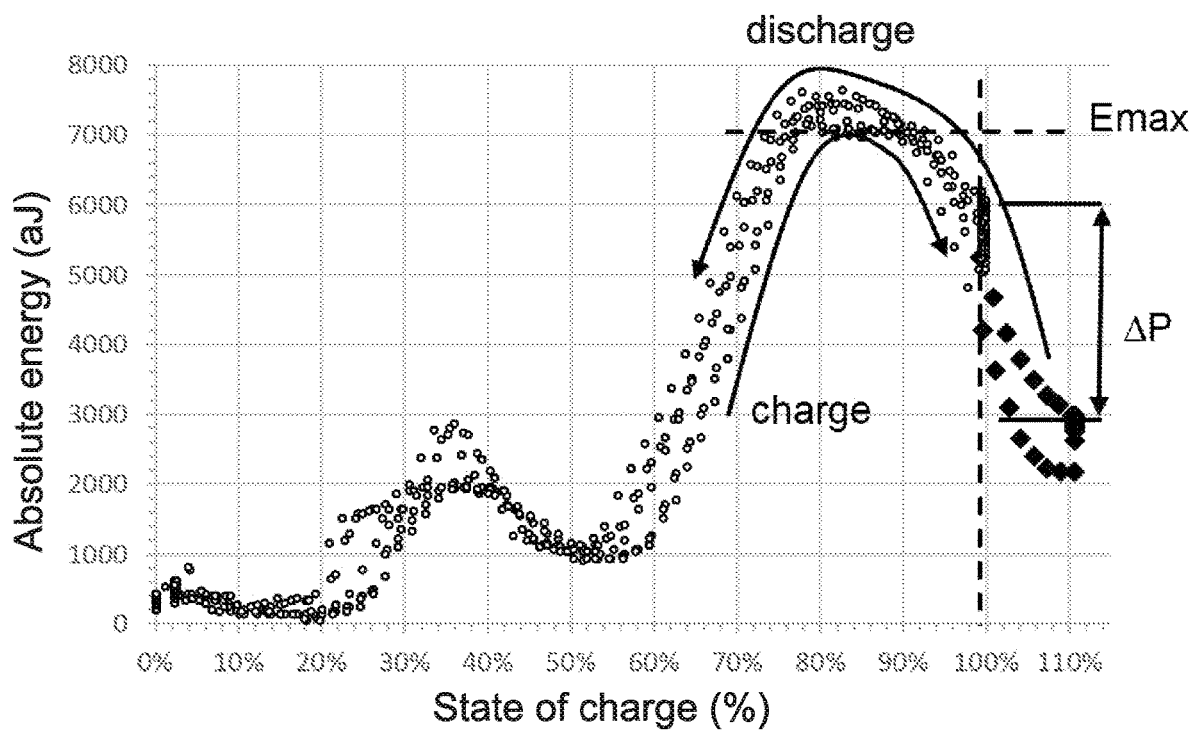

FIG. 5A shows the change in the strength of the signal as a function of time for three successive charge-discharge cycles C1, C2, C3. The first charge/discharge cycle C1 is a cycle for which the charge is complete while the second charge/discharge cycle C2 is a cycle for which the battery is charged to 110% of its nominal capacity. The cycle C3 is again a charge-discharge cycle identical to C1. For each charge/discharge cycle C1, C2, C3, two peaks of maximum strength are present, between which a plateau PL is located for which the strength of the signal (or energy of the signal) is substantially constant. It is observed however that the ordinate of this plateau in case of overloading is different from the ordinate of said plateau in case of a normal charge, this different being materialised by ΔP in FIG. 5A. FIG. 5B shows the change in the absolute energy of the signal received as a function of the state of charge of the battery during these three successive charge-discharge cycles C1, C2, C3. In the measurement library, the measurements associated with the first plateau PL would therefore be associated with a normal charge of the battery BAT while the measurements associated with the second plateau PL would be associated with an overloading. The operating regions will then be plotted in consequence in such a way that the measurement points corresponding to the first cycle C1 and to the third cycle C3 are located in the normal operating region ZN while the measurement points corresponding to the overloading during the second cycle are located in the at-risk operating region ZR even in the dangerous operating region ZD.

Figure 5C:
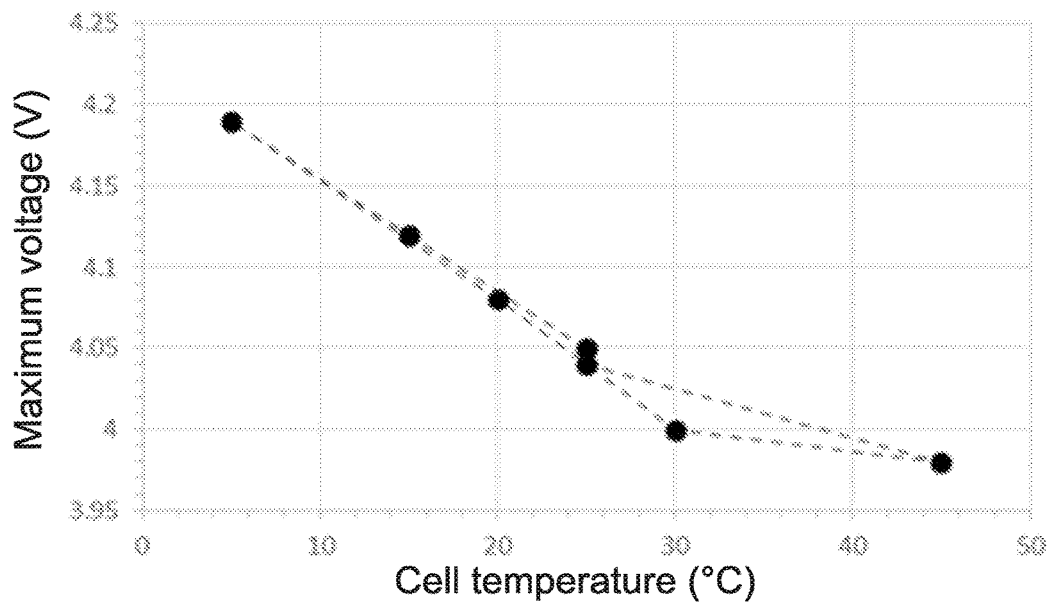
Figure 6:
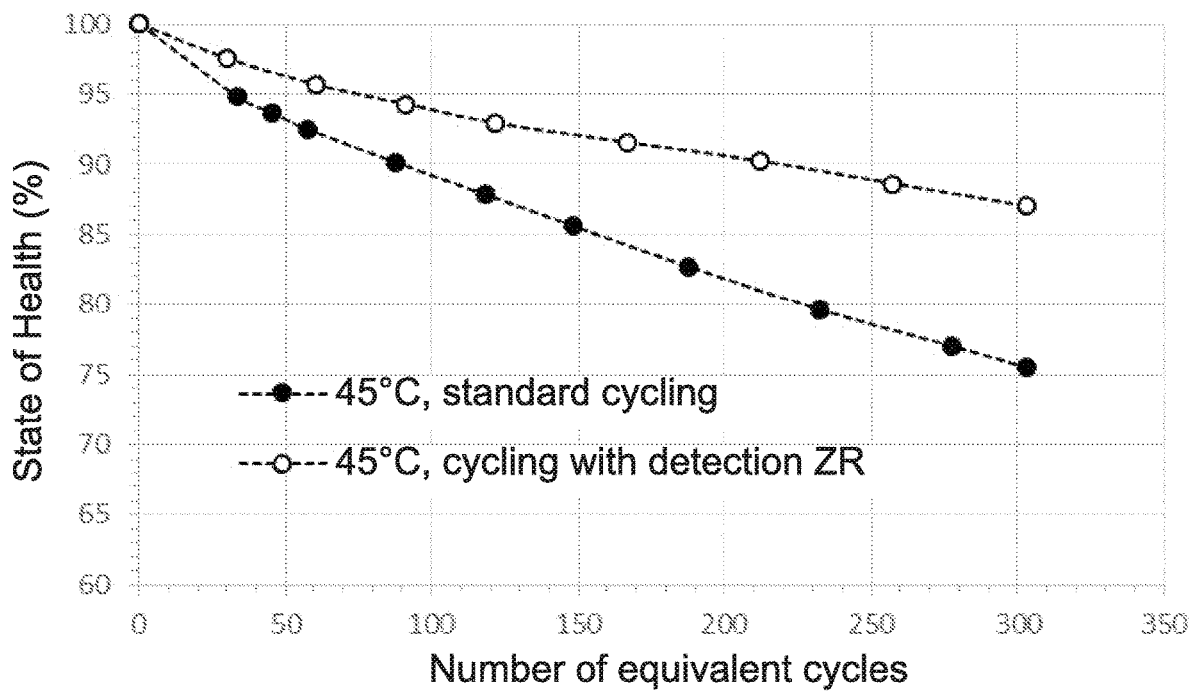
FIG. 6 shows the change in the state of health of a battery with and without implementation of a method according to a first aspect of the invention.

FIG. 5C shows the change in the maximum voltage at the terminals of the battery BAT before reaching the at-risk operating region ZR according to the temperature. The passing into the at-risk region ZR is observed a little under 4.2 V to 5° C. and the voltage value decreases when the temperature increases. Thus, at 25° C., the maximum voltage before passing into the at-risk region ZR is now only 4.05 V. It will be only 3.97 V for an operating temperature of 45° C. It is thus possible to use the detection of the passage into the at-risk region ZR to determine the maximum operating voltage of the battery BAT and improve the management of this battery BAT in order to guarantee better durability. This is in particular shown in FIG. 6 which shows an example of the change in the state of health of two batteries BAT tested with an accelerated ageing protocol. The state of health of the two batteries BAT decreases during cycling but that which benefits from the optimised management through the detection of the passage into the at-risk region ZR has a degradation in the state of health that is almost twice as less.

Figure 7A:
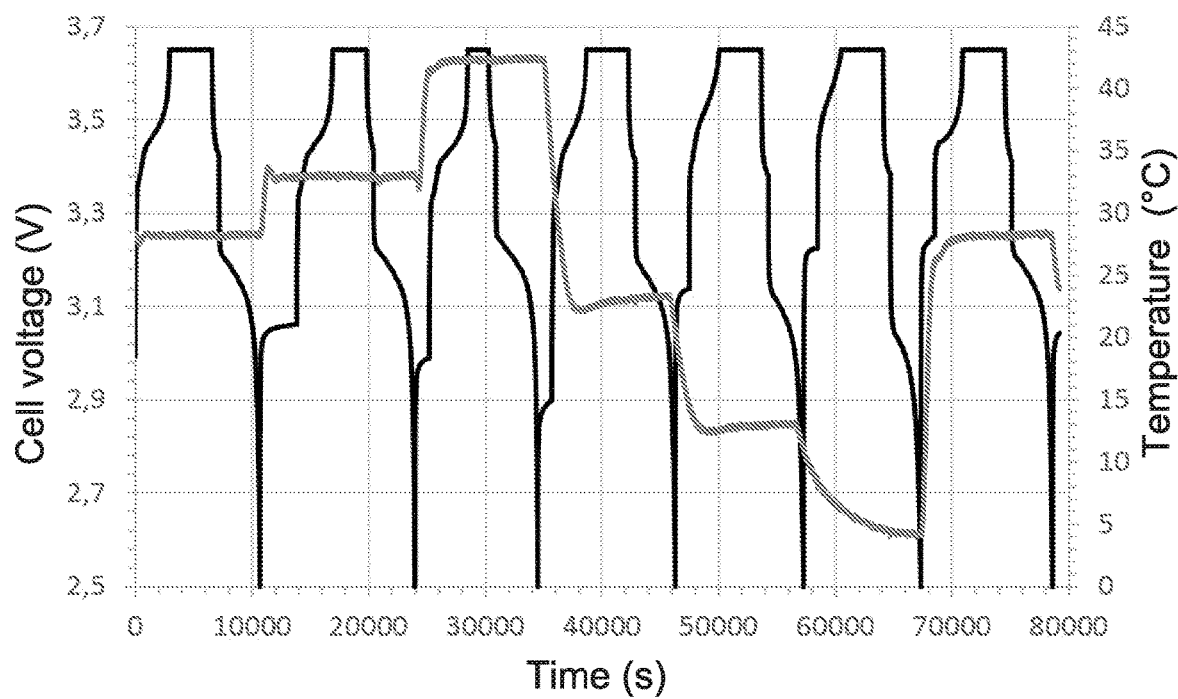
FIGS. 7A to 7C show, for FIG. 7A the voltage at the terminals of the battery during a plurality of charge/discharge cycles carried out on a Lithium-ion battery of the LFP/G type (positive electrode with an iron phosphate base, negative electrode with a graphite base) for different temperatures, for FIG. 7B the change in the flight time measured on a LFP/G battery for different temperature according to time, and for FIG. 7C the change in the flight time measured according to the temperature.

Another example of the influence that the temperature can have on the operating regime of the battery is given in FIG. 7A, which shows a plurality of charge/discharge cycles carried out for different temperatures. More particularly, it has on the one hand the change in the voltage at the terminals of the battery BAT as a function of time (the black curve) as well as the change in the temperature of said battery BAT as a function of time (the gray curve). Among the different parameters that characterise the acoustic signals transmitted, some do not change, or change very little with the state of charge of the battery, but on the other hand, change substantially with the temperature. In the example described (measurements of acoustic signals taken during charge-discharge cycles of a LFP/G cylindrical battery during variations in temperature), this is the case of the duration of the signal received, the number of strokes, or, to a lesser degree, the average frequency of the signals. This is also the case with the flight time, i.e. the time that separates the emission of the emitted signal from the reception thereof.

Figure 7B:
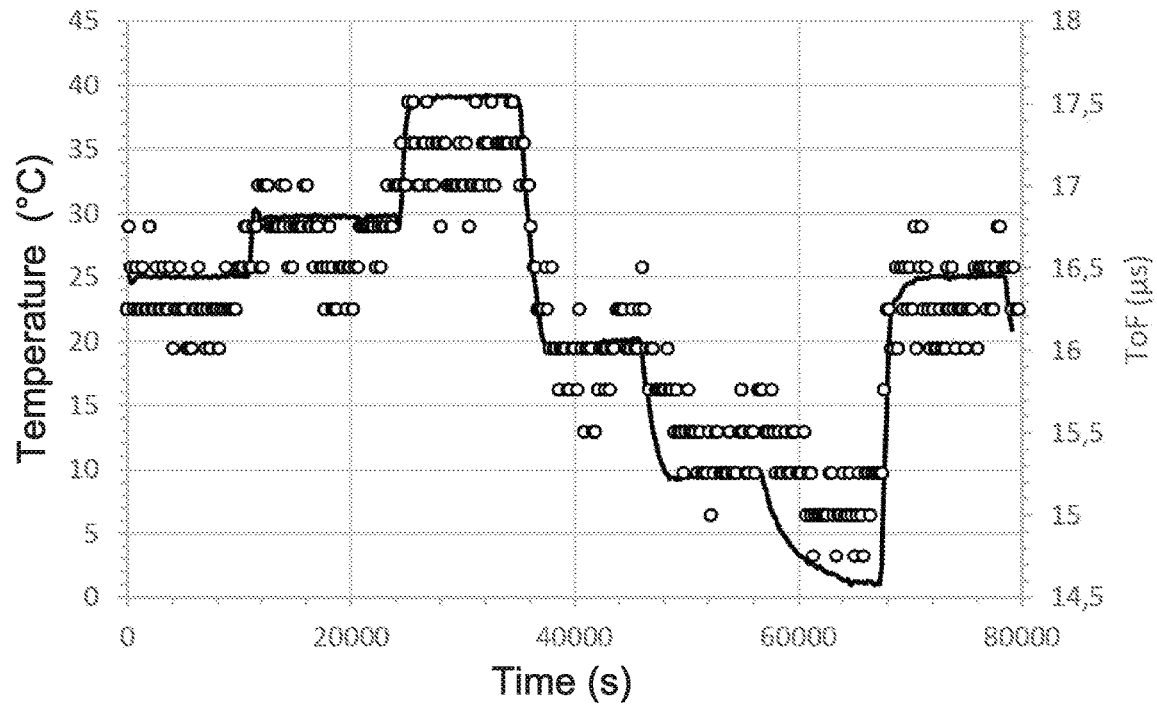
Figure 7C:
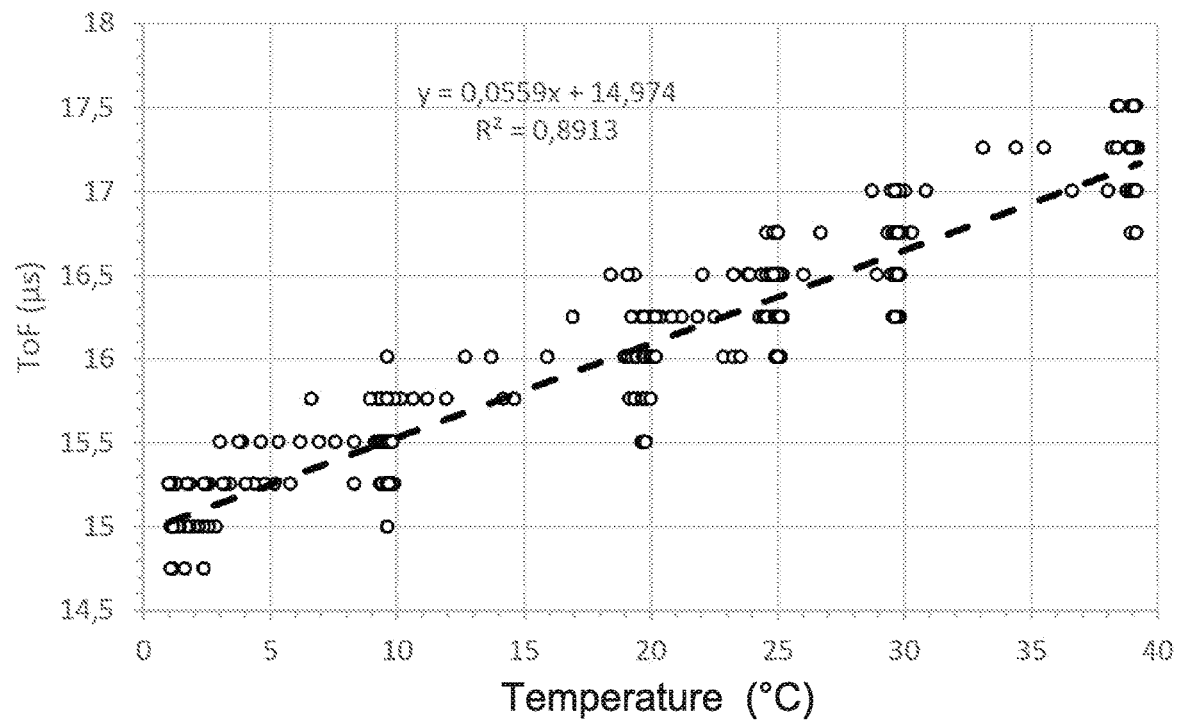

FIGS. 7B and 7C show, for FIG. 7B the flight time (the measurement points) and the temperature (the black curve) as a function of time and for FIG. 7C the flight time as a function of the temperature (the points represent the measurements and the dotted line the linear regression). From these two figures, it is therefore possible to confirm that the operating temperature is highly correlated with the flight time measured. It is therefore possible to take account, in the method according to a first aspect of the invention, the operating temperature of the battery BAT by the measurement of the flight time. This taking account of the variation in the internal temperature of the battery BAT can be used as a supplement to the measurements by temperature sensors to detect local unusual heating and to prevent risks of fire or explosion. The internal temperature measurements indeed allow for a much earlier detection and with greater precision of the heating than with the use of temperature sensors placed on the surface of the cells of the batteries and measuring only a "skin temperature".

Figure 8A:
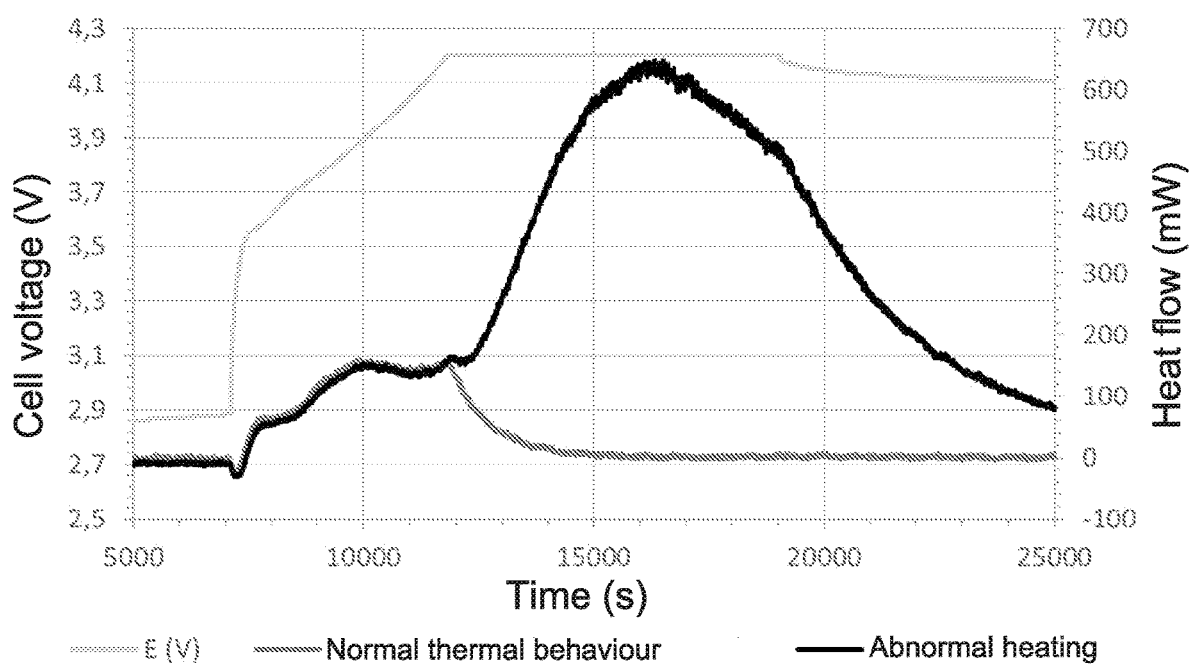
FIGS. 8A to 8D show the analysis through different parameters of two different thermal behaviours of the same battery of the NMC/G type.

Yet another example of the influence that the temperature can have is shown in FIGS. 8A to 8D. FIG. 8A shows the change in the voltage (the highest curve) and in the flow of heat released during the charging of the same battery BAT in two distinct cases: first of all, in the case of an operation where the thermal behaviour of the battery BAT is normal (the lowest curve) with a moderate release of heat, culminating at about 150 mW at the end of charging; then in a case where (curve in the middle), in exactly the same operating conditions, the flow of heat released by the battery BAT increases very sharply abnormally to reach 650 mW. Such a quantity of energy released in the form of heat is the sign of a major malfunction within the battery BAT, linked to the appearance of parasite reactions. The immediate consequences can be damage to materials, leading to an irreversible degradation in performance as well as a substantial risk in performance as well as a substantial risk of thermal runaway that can lead to a destruction of the battery BAT as well as safety problems (gaseous releases, opening of the safety vent, fire, explosion, etc.). It is therefore essential to be able to detect such a malfunction as early as possible in order to proceed with suitable corrective actions (limitation of the current, emergency stop, etc.).

Figure 8B:
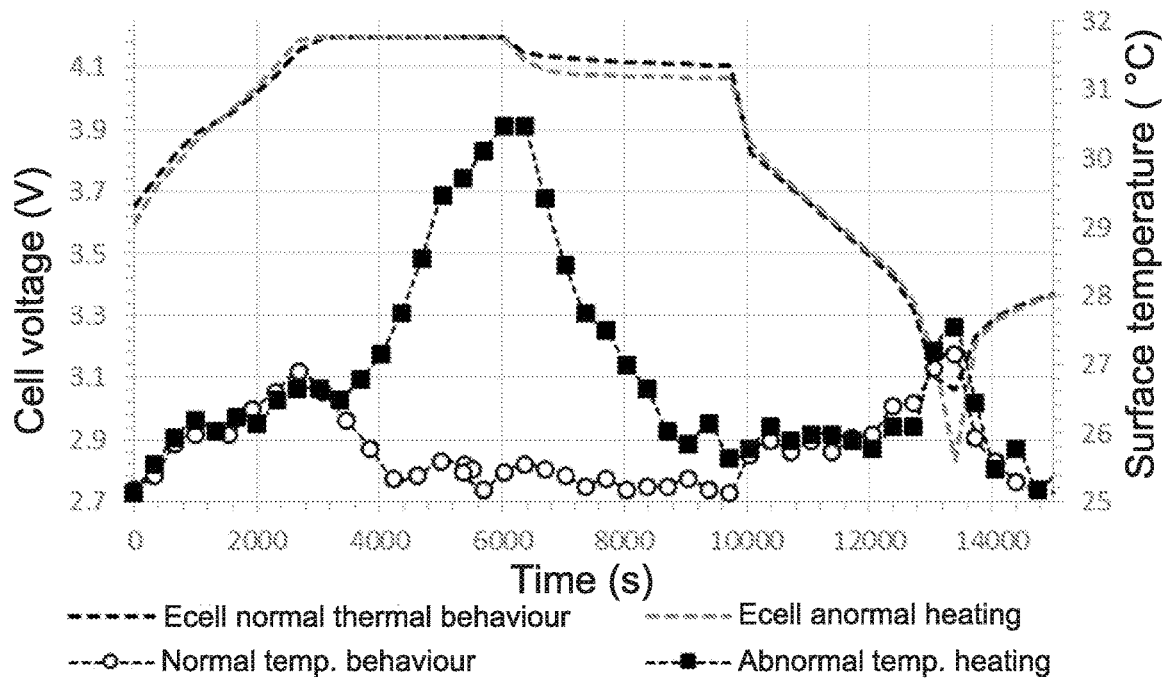

FIG. 8B shows the change in the voltage at the terminals of the battery BAT during the charge in both cases (normal and abnormal operation) and shows the fact that the change in the voltage at the terminals of the battery BAT does not make it possible to detect this abnormal heating. FIG. 8B also shows the change in the surface temperature of the battery BAT in the two cases (normal and abnormal behaviours). The abnormal release of heat is indeed detected, but, in this precise case, results in an increase of only a few degrees in the surface temperature (5° C.) in relation to normal operation. Such a heating can therefore easily go unnoticed although the consequences of it can be very detrimental to the later performance and even the safety of the system.

Figure 8C:
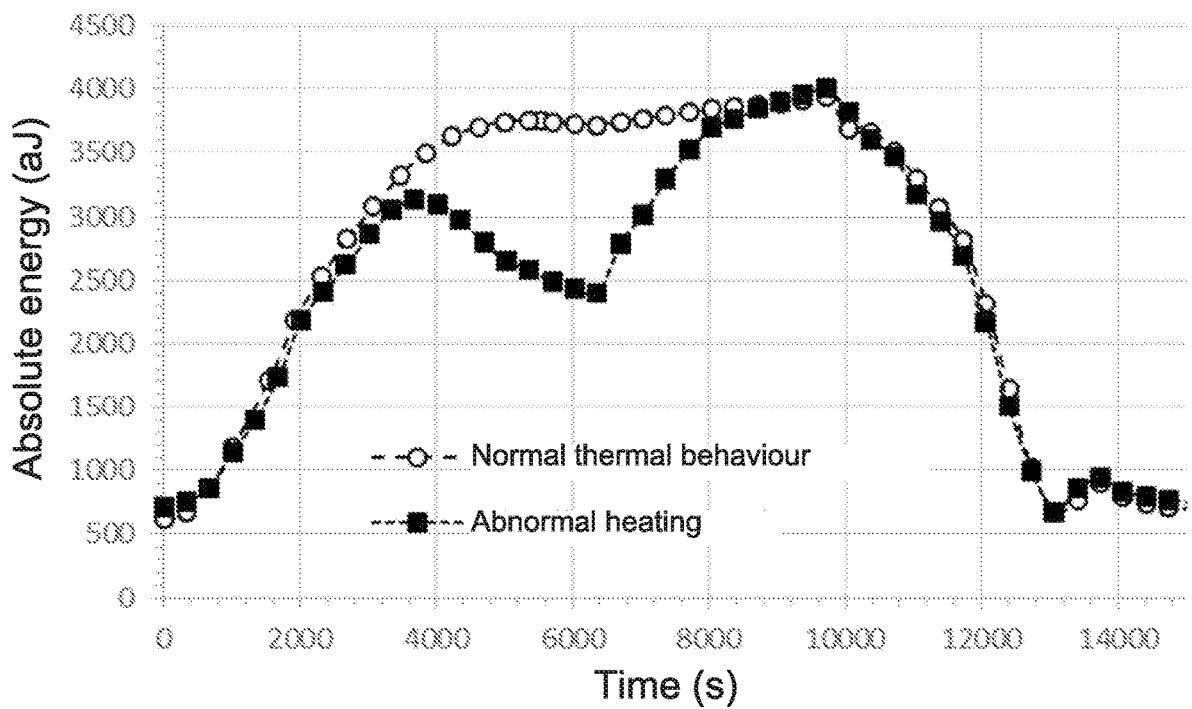
Figure 8D:
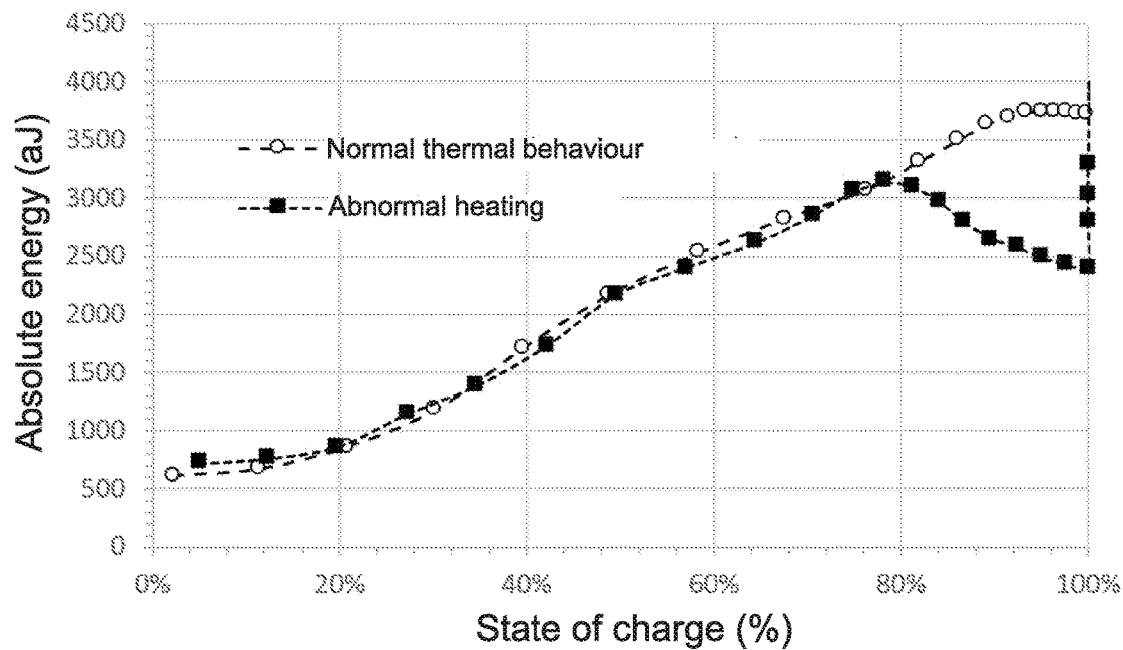

FIG. 8C shows the change in the absolute energy of the signal as a function of time for the normal and abnormal behaviour and shows that the abnormal thermal behaviour can be detected by the measurement of the absolute energy of the acoustic signals: indeed the latter, in the case of abnormal behaviour, no longer follows the normal change, with the absolute energy of the acoustic signals diminishing substantially. As shown in FIG. 8D, the same measurement of absolute energy can be done according to the state of charge and also show that an abnormal behaviour can be revealed by such a measurement.

Figure 9A:
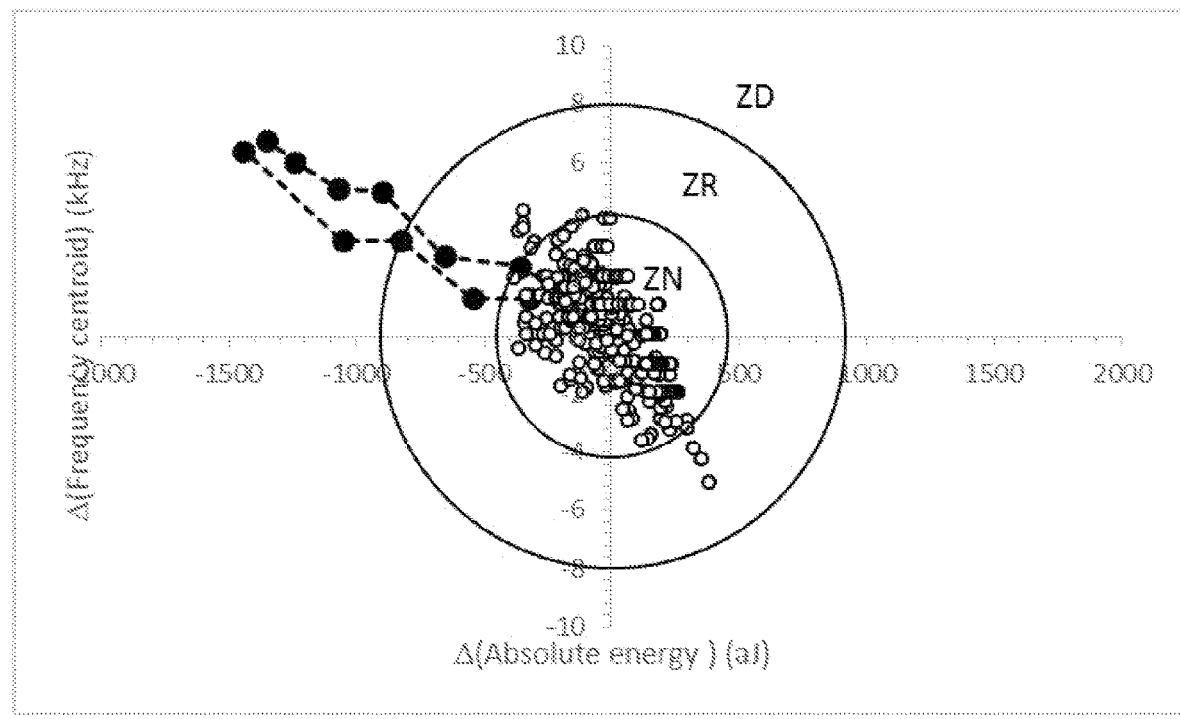
FIGS. 9A to 9C show the determination of the different operating regions of the same battery of the NMC/G type.

Using these different measurements, it is possible to determine a mapping of the operation of the battery BAT. FIG. 9A shows a simplified mapping (the latter taking only two parameters into account) shows on the abscissa the difference in the frequency centroid and on the ordinates the difference in absolute energy. Each measurement point in this space corresponds to an acoustic signal received. The white points correspond to an operation in normal conditions, the black points correspond to the acoustic signals recorded when the battery BAT shows an abnormal release of heat during the operation thereof.

Figure 9B:
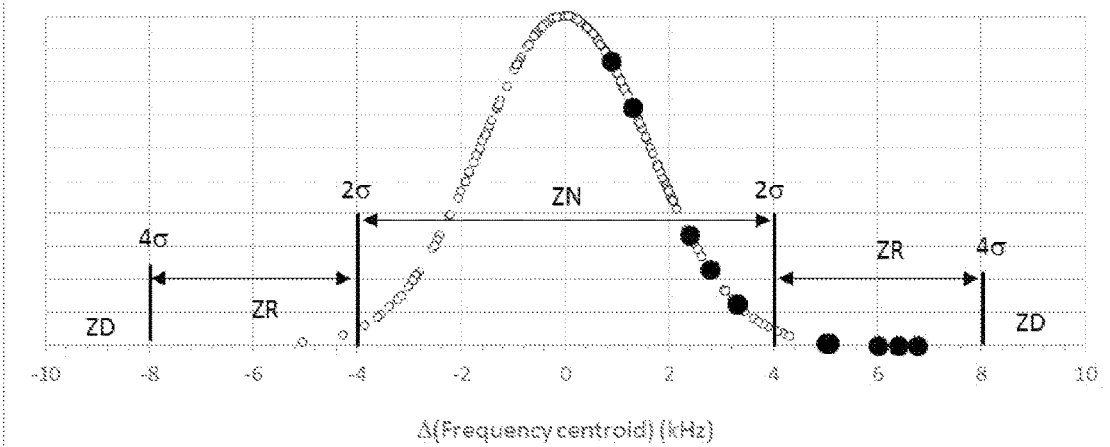
Figure 9C:
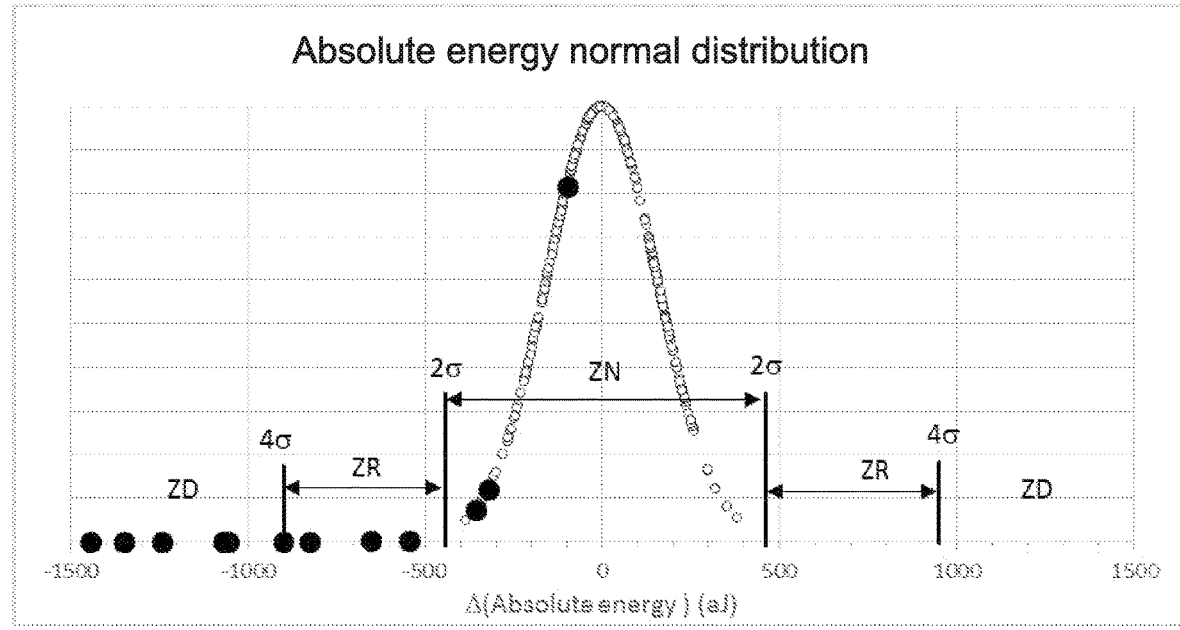

Three operating regions have been defined in this space: normal operating region ZN, at-risk operating region ZR and dangerous operating region ZD. In an embodiment, these three regions are defined using the distribution of the measurements obtained for the parameters considered (FIGS. 9B and 9C). A statistical analysis makes it possible to calculate the standard deviation of the values measured in normal operating conditions for each parameter. Thus, for each parameter, the limit between normal operating region ZN and at-risk region ZR can be defined from the standard deviations measured. In an embodiment, the tolerated deviation for the region ZN corresponds to $2\sigma$ (contains statistically more than 95% of the values obtained in normal operation) and the limit defined for the at-risk region can be calculated from a deviation of $4\sigma$ (containing statistically more than 99.99% of the values obtained in normal operation). The tolerated deviation of course be adapted according to the considered use. It clearly appears on this mapping that the measurements that correspond to an abnormal state (black point) exit from the normal operating region ZN to reach the at-risk operating region ZR and even the dangerous operating region ZD. The abnormal behaviour can therefore be detected using a method 100 according to a first aspect of the invention.

These different examples make it possible to show how taking a plurality of parameters of the signal measured into account makes it possible to detect one or more anomalies (overloading, heating, etc.), where as the measuring a single parameter (state of charge, voltage at the terminals of the battery BAT, etc.) would not be sufficient.

In an embodiment, the mapping CG comprises a reference point REF located in the normal operating region ZN. In addition, each region is associated with a speed limit. The speed is positive when it is moving away from the reference point REF and negative when it is approaching the reference point REF. Furthermore, each measurement cycle comprises a step of calculating the speed of the measurement point in the mapping CG, this speed being equal to the distance between the measurement point obtained during the preceding measurement cycle and the current measurement point (i.e. corresponding to the measurement cycle in progress) divided by the measurement period. It is useful to note that each signal received has a large number of parameters (frequencies, amplitudes, strengths, energies, durations, flight time, etc.), and therefore the mapping CG is carried out in a space of a great dimension wherein each measurement obtained during a measurement cycle is a point in said space. It is thus possible to compare the various points of this space, in particular by measuring the distance that separates two points. This distance can for example be a Euclidian, Manhattan or Minkowski distance.

It also comprises a step of comparing the speed of the measurement point with the speed limit associated with the region in which the measurement point is located. It finally comprises, when the speed of the measurement point is greater than the speed limit associated with the region in which the measurement point is located, the triggering of the step 104 of detecting an anomaly. It will be noted that the comparison takes account of the sign of the speed. Thus, a measurement point that tends to approach the reference point, and therefore the normal operating region will not give rise to the detection of an anomaly since the measurement point itself is not located outside the normal operating region ZN.

In an embodiment, each measurement cycle comprises a step 105 of triggering an alert when an anomaly is detected.

Thus, the method makes it possible to identify when the operating regime of the battery is abnormal.

In an embodiment, a step of correcting the operating state of the battery BAT is triggered by the step 105 of triggering an alert. Thus, in addition to informing the user of the presence of a problem in the operation of the battery BAT, the management system can initiate one or several corrective actions. The corrective actions include in particular the limitation of the maximum power delivered by the battery BAT, the reduction in the maximum allowed voltage range at the terminals of the battery BAT or the limitation of the range of temperatures that are acceptable for the battery BAT. In an embodiment, the corrective action or actions can be carried out gradually, more preferably by carrying out a measurement cycle between each correction so as to measure the effect of said correction, in such a way as to limit the impact of the corrective action or actions on the operation of the battery BAT. In an embodiment, the method 100 comprises, when the step of correcting does not make it possible to re-establish a normal operating regime of the battery BAT after a predetermined period of time (or after a predetermined number of measurement cycles), a step of switching to degraded mode or a step of stopping the system.

In an embodiment, a step of reducing the measurement period is triggered by the step 104 of triggering an alert. Thus, when the battery BAT is in an abnormal operating state, the state of the latter is measured more regularly in such a way that any corrective actions, the switching to degraded mode and/or the stopping of the system are triggered as quickly as necessary. In an embodiment, when the operating regime of the battery BAT returns to normal, the measurement period can be reinitialised to its starting value.

In an embodiment, each measurement point obtained during each cycle is stored until a number of measurement points is obtained equal to a threshold value (for example, a threshold value greater than or equal to 100 in such a way as to obtain a statistical representative distribution), termed adaptation threshold, the position of the reference point REF being recalculated then the measurement points erased when said threshold is reached. The storing of these measurement points can be done in the memory of the calculating means MC, with the portion of the memory thus occupied being released when the position of the reference point REF is recalculated. Preferably, the position of the new reference point REF corresponds to the barycentre of the measurement points stored. This makes it possible to modify the position of the reference point REF during the course of the life of the battery BAT and therefore to take the ageing thereof into account. It will be noted that the change in position of the reference point also changes the three operating regions described hereinabove.

So as to implement a method 100 according to a first aspect of the invention, a second aspect of the invention relates to a system for managing a battery BAT. The battery management system BAT can comprise means for controlling and measuring the reference physical quantities of the battery BAT such as the current delivered by said battery BAT or the voltage at the terminals of said battery BAT. The means of control can in particular be used in order to correct the operating regime of the battery BAT if such a correction is required. In addition, the management system of the battery BAT comprises an acoustic emitter EA configured to be attached to a wall of the battery BAT. The acoustic emitter EA is preferably a piezoelectric acoustic emitter EA and the latter is attached to a wall of the battery BAT using a glue or any other means of attaching. The management system of the battery BAT also comprises an acoustic receiver RA configured to be attached to a wall of the battery BAT. As with the acoustic emitter EA, the acoustic receiver RA is preferably a piezoelectric acoustic receiver RA and the latter is attached to a wall of the battery BAT using a glue or any other means of attaching. For example, the acoustic emitter/receiver EA/RA can have a PVDF (PolyVinyliDene Fluoride) base, a device that generally has wide resonance frequency bands comprised between kHz and MHz. Alternatively, the acoustic emitter/receiver EA/RA can have a PZT (lead zirconate titanate) base, a device that generally has narrow resonance frequency bands comprised between 10 kHz and a few hundred kHz. Preferably, the wall on which the acoustic emitter EA is attached and opposite the wall on which the acoustic receiver RA is attached. The management system also comprises a calculating means MC connected to the acoustic emitter EA and to the acoustic receiver RA. The calculating means MC can have the form of a processor associated with a memory, an ASIC board or an FPGA. The connection of the calculating means MC with the acoustic emitter and the acoustic receiver can be done by means of a bus, a connection of the Ethernet® type, or by means of a wireless connection, for example Bluetooth®. The calculating means MC also includes a memory wherein a mapping CG is stored. This mapping CG defines a first operating region termed the normal operating region ZN, a second operating region termed the at-risk operating region ZR and a third operating region termed the dangerous operating region ZD.

Furthermore, the acoustic emitter EA is configured to emit on instruction from the calculating means MC an acoustic signal by the acoustic emitter. Preferably, the acoustic signal comprises a plurality of frequencies comprised between 1 kHz and 1 MHz, preferably between 100 kHz and 200 kHz. Preferably, the acoustic signal has a duration comprised between 0.2 and 1 ms. In addition, the acoustic receiver RA is configured to receive the acoustic signal and to transmit said signal to the calculating means MC. Finally, the calculating means MC is configured to determine the operation region in which the measuring point is located and, when the measurement point is located in the at-risk operating region ZR or the dangerous operating region ZD, detect an anomaly.

The invention claimed is:

1. A method for detecting an anomaly in the operation of a battery using a battery management system, said system comprising an acoustic emitter configured to be attached to a wall of the battery, an acoustic receiver configured to be attached to a wall of the battery, said acoustic receiver being attached to a wall of the battery during the implementation of the method, and a calculating system connected to the acoustic emitter and to the acoustic receiver, a mapping defining a first operating region corresponding to a normal operating region, a second operating region corresponding to an at-risk operating region and a third operating region corresponding to a dangerous operating region, wherein the mapping comprises a reference point located in the normal operating region, each region being associated with a speed limit, a speed being positive when the speed is moving away from the reference point and negative when the speed is approaching the reference point, said method comprising at least a first measurement cycle, each measurement cycle being separated from the preceding measurement cycle by a period termed the measurement period, each measurement cycle comprising:

a step of emitting an acoustic signal by the acoustic emitter on instruction from the calculating system;

a step of receiving an acoustic signal by the acoustic receiver, the received signal being transmitted to the calculating system so as to obtain a measurement point in the mapping;

a step of determining the operating region in which the measurement point is located;

a step of calculating the speed of the measurement point in the mapping, said speed being equal to the distance between the measurement point obtained during the preceding measurement cycle and the current measurement point divided by the measurement period;

a step of comparing the speed of the measurement point with the speed limit associated with the operating region in which the measurement point is located;

when the measurement point is located in the at-risk operating region or in the dangerous operating region, and when the speed of the measurement point is greater than the speed limit associated with the operating region in which the second measurement point is located, triggering the step of detecting an anomaly.

2. The method according to claim 1 wherein, each measurement cycle comprises, when an anomaly is detected, a step of triggering an alert.

3. The method according to claim 1, wherein each cycle comprises, when an anomaly is detected or an alert is triggered, a step of correcting the operating regime of the battery.

4. The method according to claim 3, comprising, when the step of correcting does not make it possible to re-establish a normal operating regime of the battery after a predetermined period of time, a step of switching to degraded mode or a step of stopping the system.

5. The method according to claim 2, wherein a step of reducing the measurement period is triggered by the step of triggering an alert.

6. The method according to claim 1, wherein each measurement point obtained during each cycle is stored until a number of measurement points is obtained equal to a threshold value, termed adaptation threshold, a position of the reference point being recalculated then the measurement points erased when said threshold is reached.

7. A battery management system comprising means for implementing the method according to claim 1.

8. A computer program comprising instructions that lead a battery management system to execute the steps of the method according to claim 1.

9. A non-transitory computer readable medium readable by a computer including a computer program comprising instructions for performing the method of claim 1.

* * * * *